July 31, 1923

L. FOOTE

SEALING RING

Filed April 19, 1922

1,463,360

WITNESSES
H. T. Walker
F. J. Foster

INVENTOR
Leonard Foote
BY Munn & Co
ATTORNEYS

Patented July 31, 1923.

1,463,360

UNITED STATES PATENT OFFICE.

LEONARD FOOTE, OF PEDRO MIGUEL, CANAL ZONE, PANAMA.

SEALING RING.

Application filed April 19, 1922. Serial No. 555,645.

*To all whom it may concern:*

Be it known that I, LEONARD FOOTE, a citizen of the United States, and a resident of Pedro Miguel, Canal Zone, Panama, have invented a new and Improved Sealing Ring, of which the following is a full, clear, and exact description.

This invention relates to improvements in sealing rings, particularly to a sealing ring which is adapted to form part of a liquid shaker and to be interposed between the mouths of a pair of ordinary glass tumblers to form a shaker.

An object of the invention is to provide a sealing ring of this character of incorrodible material, which will serve to firmly seal the mouths of both tumblers used in the shaking operation, and a ring which will be simple and practical in construction, easy to clean, efficient in use, and capable of being manufactured with comparative economy.

With these and other objects in view, the invention consists in certain novel features of construction, and combinations and arrangements of parts, as will be more fully hereinafter described and pointed out in the claims.

Figure 1:
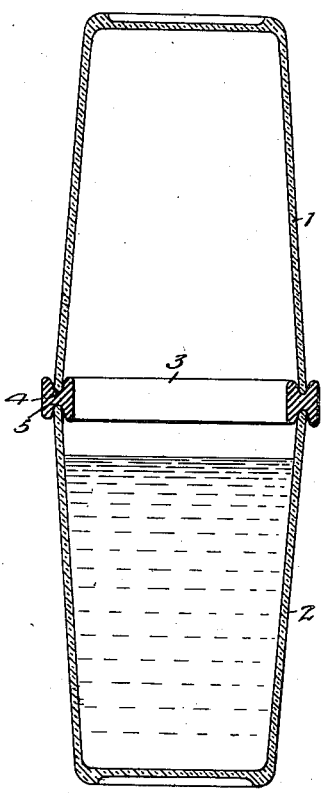
Figure 1 is a view in longitudinal section through a liquid shaker showing the manner of use of my improved sealing ring.
Figure 2:
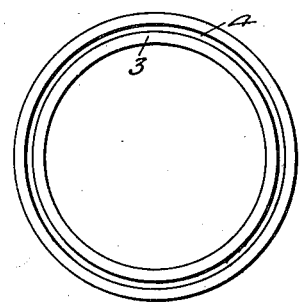
Figure 2 is a top plan view of the ring.

Referring in detail to Figures 1 and 2 of the drawings, I have used the reference numerals 1 and 2 to designate a pair of ordinary glass tumblers and the numeral 3 to designate my improved sealing ring which is interposed between the mouths of the tumblers to form a liquid shaker. This shaker may be used for mixing drinks, beating eggs, or for various other purposes. The ring 3 is preferably formed of rubber or some similar incorrodible compressible material which will insure a tight seal between the mouths of the two glasses.

The ring merely comprises an annular band of rubber formed with annular grooves 4 and 5 in its opposite upper and lower faces adapted to receive the mouths of the two glasses; in other words, the band includes a reduced intermediate portion or rib formed by the grooves and relatively wide inner and outer walls adapted to overlie and encircle the inner and outer faces of the mouths of the glasses.

Figure 3:
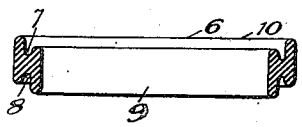
Figure 3 is a sectional view illustrating a slight modification.

In Figure 3, I have illustrated a slight modification wherein I provide a band 6 formed with grooves 7 and 8. With this form of the invention, however, the inner wall 9 is offset from the horizontal plane of the outer wall 10.

Figure 4:
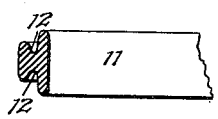
Figures 4, 5, 6 and 7 are all fragmentary sectional views of modified forms of rings embodying the invention.

In Figure 4, I have shown a ring 11 formed with grooves 12. The inner wall of this ring, however, is preferably wider than the outer wall.

Figure 5:
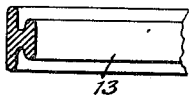

In Figure 5, I have shown a ring 13 of substantially similar construction with the ring 11 except that in this instance the outer wall of the ring is higher than the inner wall.

Figure 6:
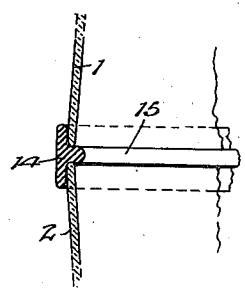
Figure 7:
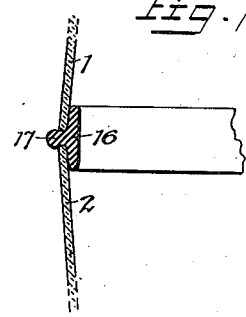

Figure 6 shows a rubber ring 14 provided with an internal annular rib 15 adapted to be compressed between the mouths of the two tumblers, and Figure 7 shows an annular ring 16 formed with an external annular rib 17 adapted to be compressed by the two tumblers, the ring 16 in this instance lying on the inner faces of the tumblers instead of on the outer faces thereof, as in the case of the ring 14.

An additional advantage of a mixer which uses my ring in a pair of ordinary glass tumblers is the fact that in mixing a cold drink a lower temperature is secured with my mixer inasmuch as one of the tumblers comprising the mixer may be used for serving the drink and the mixing operation will bring the temperature of this tumbler down approximately to the temperature of the drink. This obviates the very common inconvenience of spoiling a cold drink by pouring it into a comparatively warm glass after the mixing operation and raising the temperature of the mixture.

It is to be noted, furthermore, that the usual type of mixers or shakers which include a pair of interfitting metal cups cannot be made of glass for very obvious and practical reasons. When mixing eggs or other material with my improved device comprising the ring and the two tumblers, it is possible at any time to see the state of the mixture and whether or not it has been sufficiently shaken.

I have illustrated some of the preferred embodiments of the invention. Various slight changes and alterations, however, might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. As a new article of manufacture, a sealing ring of the kind described comprising an annular unitary compressible member including a wall and an annular rib intermediate the top and bottom edges of the wall to permit the wall to engage flatly the rim-adjacent peripheries of a pair of glass tumblers when such tumblers are arranged rim to rim with their rim edges resting as opposite sides of said rib.

2. As a new article of manufacture, a sealing ring of the kind described comprising an annular unitary compressible member including a wall and an annular rib intermediate the top and bottom edges of the wall to permit the wall to engage flatly the rim-adjacent peripheries of a pair of glass tumblers when such tumblers are arranged rim to rim with their rim edges resting on opposite sides of said rib, said member including also a second wall arranged substantially parallel to the first wall, the two walls being joined by said rib intermediate the top and bottom edges of both walls.

3. As a new article of manufacture, a sealing ring of the kind described comprising an annular unitary compressible member formed with annular grooves in its upper and lower faces.

4. As a new article of manufacture, a sealing ring of the kind described comprising an annular unitary compressible member formed with annular grooves in its upper and lower faces, said grooves being adapted to receive the lips of tumblers, the material forming the walls of the grooves being adapted to overlie the rim edges of tumblers in the grooves.

LEONARD FOOTE.